(12) United States Patent
Draper

(10) Patent No.: US 8,371,100 B2
(45) Date of Patent: Feb. 12, 2013

(54) SYSTEM AND METHOD TO GENERATE ELECTRICITY

(75) Inventor: Samuel David Draper, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/432,859

(22) Filed: Mar. 28, 2012

(65) Prior Publication Data
US 2012/0187688 A1    Jul. 26, 2012

Related U.S. Application Data

(62) Division of application No. 12/889,147, filed on Sep. 23, 2010, now Pat. No. 8,166,766.

(51) Int. Cl.
*F02C 6/00* (2006.01)

(52) U.S. Cl. ...................... 60/39.182; 60/39.5
(58) Field of Classification Search .............. 60/39.182, 60/39.5, 39.52, 39.37, 806
See application file for complete search history.

(56) References Cited

U.S. PATENT DOCUMENTS

| | | |
|---|---|---|
| 4,313,300 A | 2/1982 | Wilkes et al. |
| 5,267,434 A | 12/1993 | Termuehlen et al. |
| 5,628,183 A | 5/1997 | Rice |
| 5,727,379 A | 3/1998 | Cohn |
| 5,794,431 A | 8/1998 | Utamura et al. |
| 6,202,400 B1 | 3/2001 | Utamura et al. |
| 6,598,402 B2 | 7/2003 | Kataoka et al. |
| 7,266,940 B2 * | 9/2007 | Balan et al. ............... 60/39.181 |
| 7,801,660 B2 | 9/2010 | Zhang et al. |
| 7,966,829 B2 | 6/2011 | Finkenrath et al. |
| 2008/0309087 A1 | 12/2008 | Evulet et al. |
| 2009/0056334 A1 | 3/2009 | West et al. |
| 2009/0120088 A1 | 5/2009 | Chillar et al. |
| 2009/0142194 A1 | 6/2009 | Draper et al. |
| 2009/0150056 A1 | 6/2009 | Hibshman, II et al. |
| 2009/0158734 A1 | 6/2009 | West et al. |
| 2009/0178417 A1 | 7/2009 | Draper et al. |
| 2009/0193787 A1 | 8/2009 | West et al. |
| 2009/0284013 A1 | 11/2009 | Anand et al. |
| 2010/0101545 A1 | 4/2010 | Draper et al. |

FOREIGN PATENT DOCUMENTS

| | | |
|---|---|---|
| JP | 62258107 A | 11/1987 |
| JP | 2009276053 A | 11/2009 |

OTHER PUBLICATIONS

JP Office Action dated Jul. 17, 2012 from corresponding Application No. 2011-198922 along with unofficial English translation.

\* cited by examiner

*Primary Examiner* — Phutthiwat Wongwian
(74) *Attorney, Agent, or Firm* — Cantor Colburn LLP

(57) ABSTRACT

A split heat recovery steam generator (HRSG) arrangement including a first HRSG coupled to a turbine and thereby receptive of a portion of the exhaust gases to deliver the portion of the exhaust gases to a compressor, a second HRSG coupled to the turbine and thereby receptive of a remaining portion of the exhaust gases, which includes an NOx catalyst and a CO catalyst sequentially disposed therein to remove NOx and CO from the exhaust gases and an air injection apparatus to inject air into the second HRSG between the NOx catalyst and the CO catalyst to facilitate CO consumption at the CO catalyst.

17 Claims, 3 Drawing Sheets

SYSTEM AND METHOD TO GENERATE ELECTRICITY

CROSS-REFERENCE TO RELATED APPLICATION

This application is a divisional application of U.S. application Ser. No. 12/889,147, now allowed, which is entitled "SYSTEM AND METHOD TO GENERATE ELECTRICITY," and was filed on Sep. 23, 2010. The entire contents of U.S. application Ser. No. 12/889,147 are incorporated herein by reference.

BACKGROUND OF THE INVENTION

The subject matter disclosed herein relates to gas turbine engines and, more particularly, to gas turbine engines using stoichiometric exhaust gas recirculation.

In gas turbine (GT) engines, compressed air and fuel are mixed together and combusted to produce high energy fluids that are directed to a turbine section where the fluids interact with turbine buckets to generate mechanical energy, which can be employed to generate power and electricity. In particular, the turbine buckets may rotate a shaft to which an electrical generator is coupled. Within the electrical generator, the shaft rotation induces current in a coil electrically coupled to an external electrical circuit. As the high energy fluids leave the turbine section they can be redirected to a heat recovery steam generator (HRSG) where heat from the fluids can be used to generate steam for steam turbine engines and further power and electricity generation.

With the combustion of the air and the fuel, however, emissions and/or pollutants, such as Carbon Monoxide (CO) and Oxides of Nitrogen (NOx), are produced and may be found in gas turbine engine emissions. Reductions of these pollutants are necessary to lessen the negative environmental impacts of gas turbine engines and to comply with regulations. Often however reduction of pollutants is directly connected to a loss of efficiency that impacts the economic value of electricity generation.

BRIEF DESCRIPTION OF THE INVENTION

According to one aspect of the invention, a split heat recovery steam generator (HRSG) arrangement to reduce emissions in exhaust gases emitted from a turbomachine system to generate electricity including a compressor, a combustor fluidly coupled to and disposed downstream from the compressor and a turbine fluidly coupled to and disposed downstream from the combustor to receive combustion gases and fluidly connected to the compressor to receive cooling and leakage fluid is provided. The arrangement includes a first HRSG coupled to the turbine and thereby receptive of a portion of the exhaust gases to deliver the portion of the exhaust gases to the compressor, a second HRSG coupled to the turbine and thereby receptive of a remaining portion of the exhaust gases, which includes an NOx catalyst and a CO catalyst sequentially disposed therein to remove NOx and CO from the exhaust gases and an air injection apparatus to inject air into the second HRSG between the NOx catalyst and the CO catalyst to facilitate CO consumption at the CO catalyst.

According to another aspect of the invention, a system to generate electricity is provided and includes a turbomachine. The turbomachine includes a compressor, a combustor fluidly coupled to and disposed downstream from the compressor and a turbine fluidly coupled to and disposed downstream from the combustor to receive combustion gases and fluidly connected to the compressor to receive cooling and leakage fluid. The system further includes a first heat recovery steam generator (HRSG), coupled to the turbine and thereby receptive of a portion of exhaust gases output from the turbine, the first HRSG being configured to deliver the portion of the exhaust gases to the compressor, a second HRSG, coupled to the turbine and thereby receptive of a remaining portion of the exhaust gases output from the turbine, which includes an NOx catalyst and a CO catalyst sequentially disposed therein to treat the received exhaust gases and an air injection apparatus to inject air into the second HRSG between the NOx catalyst and the CO catalyst to facilitate CO consumption at the CO catalyst.

According to yet another aspect of the invention, a method of operating a turbomachine system to generate electricity is provided and includes permitting a portion of turbomachine exhaust to be received in a first HRSG for delivery to a compressor of the turbomachine and a remaining portion of the turbomachine exhaust to be received in a second HRSG in which NOx and CO in the GT engine exhaust are consumed, sensing whether the NOx and the CO consumption is substantially complete and, in an event the NOx consumption is incomplete, modulating the relative amounts of the portion and the remaining portion of the turbomachine exhaust respectively received in the first and second HRSGs and, in an event the CO consumption is incomplete, modulating an amount of air injected into the second HRSG.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
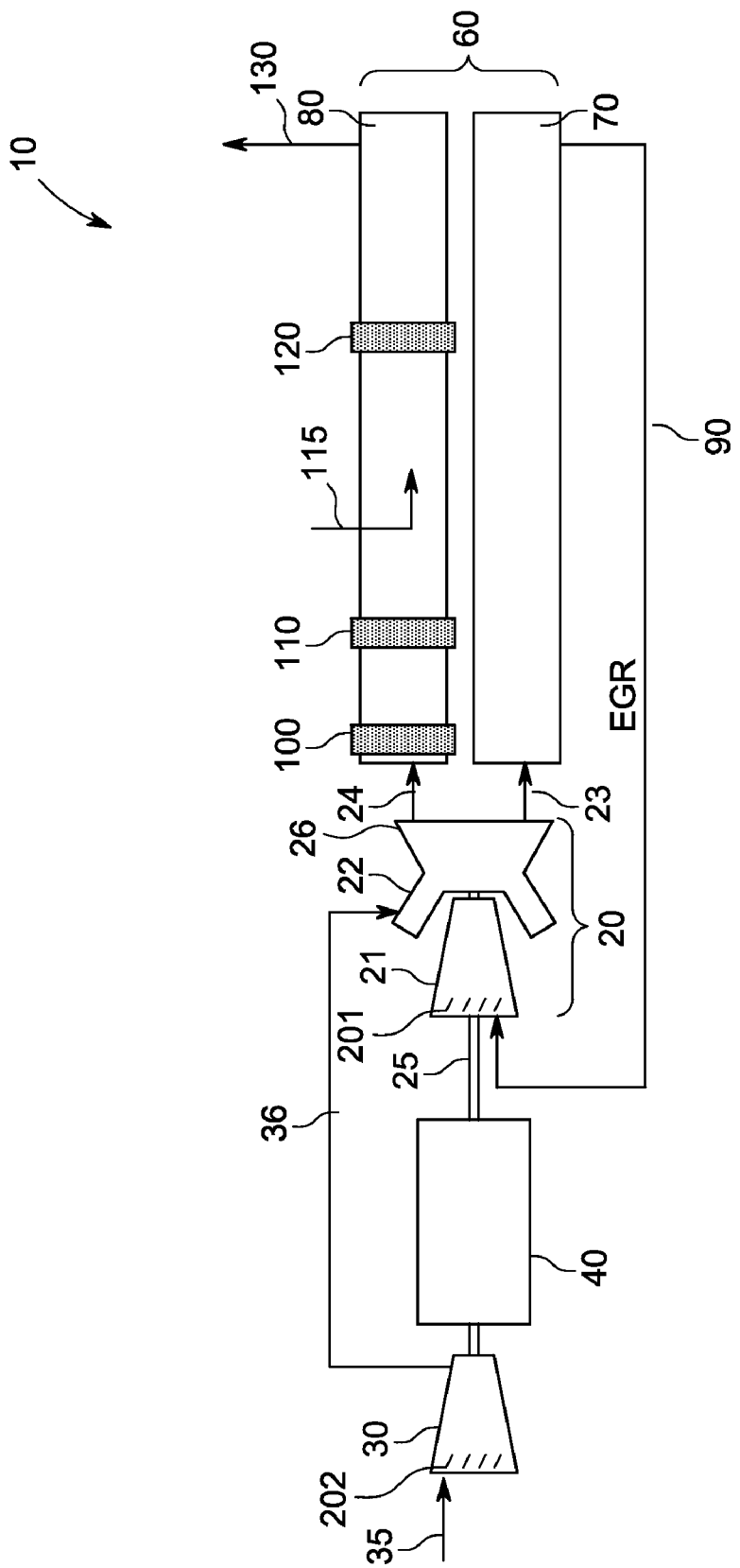
FIG. 1 is a schematic illustration of a system with a turbine engine and a split heat recovery steam generator (HRSG) arrangement.
Figure 2:
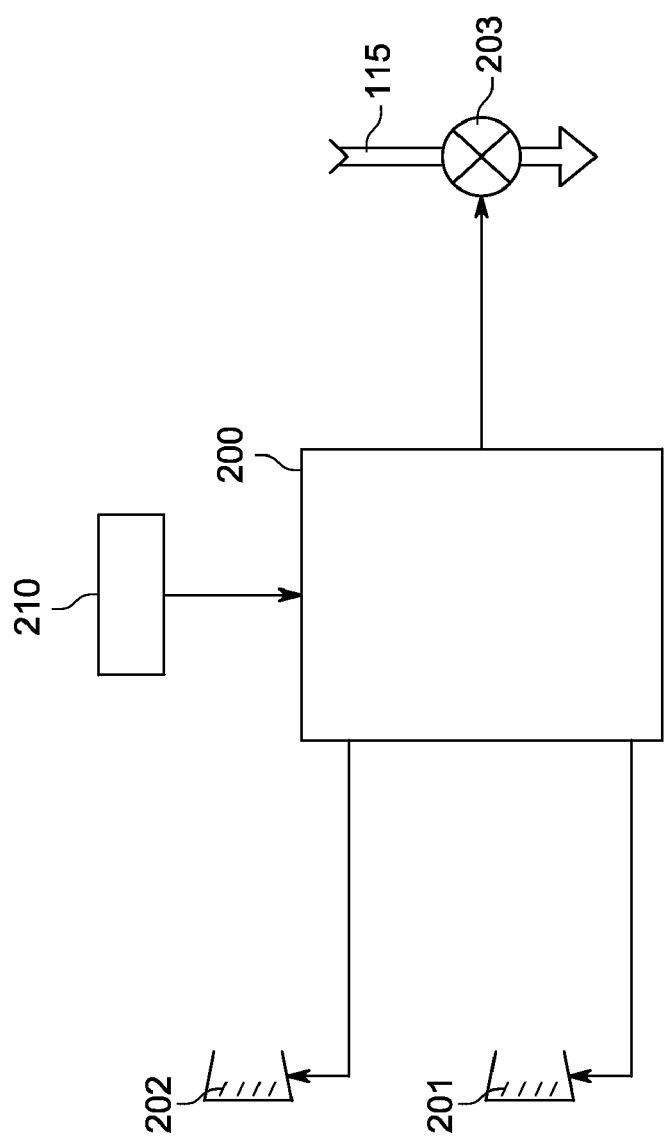
FIG. 2 is a schematic diagram of a controller for the system of FIG. 1.

With reference to FIGS. 1 and 2, a system 10 is provided to generate electricity with reduced emissions. More particularly, the system 10 is provided to generate electricity with little or no Oxides of Nitrogen (NOx) or Carbon Monoxide (CO) pollutant emissions. The system 10 includes a turbomachine, such as a gas turbine (GT) engine 20, a split heat recovery steam generator (HRSG) arrangement 60 having a first HRSG 70 and a second HRSG 80 and an air injection apparatus 115. In the GT engine 20, a compressor 21 compresses exhaust recirculated from the second HRSG 80, which is supplied to a combustor 22 that is fluidly coupled to and disposed downstream from the compressor 21. The combustor 22 may include at least one or more of dry low NOx (DLN) components and/or late lean injection (LLI) components that serve to reduce NOx emissions. A turbine 26 is coupled to the compressor 21 and the combustor 22 to receive combustion products from the combustor 22 and cooling and leakage fluid from the compressor 21.

An upstream compressor 30 is coupled to the shaft 25 such that the rotation of the shaft 25 drives upstream compressor 30 operation by which inlet air 35 is compressed and then made deliverable to the combustor 22 via conduit 36. Within the combustor 22, the compressed exhaust from the compressor 21 is mixed with air from the upstream compressor 30 and fuel, such as natural gas, synthetic gas (syngas) and/or combinations thereof. The mixture is then combusted to produce high energy fluids from which mechanical energy may be derived in the turbine 26. In particular, the mechanical energy derived from the fluids causes the shaft 25 to rotate at high speed. An electrical generator 40 is also coupled to the shaft 25 whereby the rotation of the shaft 25 induces the electrical generator 40 to generate an electrical current. In an exemplary embodiment, the fluids are communicated to the first and second HRSGs 70 and 80 via conduits 23 and 24, respectively.

The first HRSG 70 is fluidly coupled to the turbine 26 and is thereby receptive of a portion of GT engine exhaust, which is untreated, via conduit 23. The first HRSG 70 is configured to exploit the heat of the GT engine exhaust as the GT engine exhaust moves through the first HRSG 70 from a first inlet end thereof to a second end thereof in the production of steam from which additional power and/or electricity may be produced. A stoichiometric exhaust gas recirculation (SEGR) conduit 90 is coupled to the second end of the first HRSG 70 and serves to deliver the portion of the GT engine exhaust back to the compressor 21 in an SEGR loop. The SEGR loop may further cool and treat the exhaust gases.

The second HRSG 80 is fluidly coupled to the turbine 26 and is thereby receptive via conduit 24 of a remaining portion of the GT engine exhaust, which is at least initially also untreated. The second HRSG 80 operates similarly as the first HRSG 70 in that the second HRSG 80 may also produce steam from which additional power and/or electricity may be produced. In addition, the second HRSG 80 includes a first CO catalyst 100, an NOx catalyst 110 and a second CO catalyst 120, which are sequentially disposed therein to provide stoichiometric treatment of the GT engine exhaust as the GT engine exhaust travels through the second HRSG 80. In some cases, only the NOx catalyst 110 and the second CO catalyst 120 are provided in the second HRSG 80.

With the relative amounts of the portion of the GT engine exhaust permitted to flow to the first HRSG 70 and the remaining portion permitted to flow to the second HRSG 80 maintained at respective predefined levels, the GT 20 can be made to operate such that the GT engine exhaust is substantially free of oxygen ($O_2$). The GT 20 may be therefore positioned for application of the three way catalysts of the second HRSG 80 to reduce NOx and CO emissions to or substantially close to zero. At the same time, with the operation of the air injection apparatus 115, management and reduction of the CO emissions is possible. Reduction of the CO emissions requires that the second CO catalyst operate in an oxygen rich environment and, as such, the system 10 further includes the air injection apparatus 115 to inject air into the second HRSG 80 between the NOx catalyst 110 and the second CO catalyst 120 to facilitate CO consumption at the second CO catalyst 120.

Flow to the compressor 21 is controlled by modulation of first inlet guide vanes 201 for the gas turbine compressor 21 and second inlet guide vanes 202 for the upstream compressor 30. Control of the flows between these two compressors will also control the flows in the split HRSG arrangement 60.

In accordance with embodiments, the reduction of the NOx and the CO emissions is enabled when about 55-65% by mass of the GT engine exhaust is permitted to flow to the first HRSG 70 and about 35-45% by mass of the GT engine exhaust is permitted to flow to the second HRSG 80. Particularly, the reduction of the NOx and the CO emissions is enabled when about 60% by mass of the GT engine exhaust is permitted to flow to the first HRSG 70 and about 40% by mass of the GT engine exhaust is permitted to flow to the second HRSG 80. Of course, it is to be understood that this ratio is merely exemplary and could be modified or changed in response to varying conditions and HRSG or catalyst specifications. These modifications or changes may be predefined or made on an ad hoc basis by a controller 200 to be described below.

The stoichiometry of the three way catalysts of the second HRSG 80 proceeds as follows. The GT engine exhaust includes trace $O_2$, trace CO and trace NOx. The first CO catalyst 100, when it is in use, consumes substantially all the $O_2$ so there remains trace CO and trace NOx. In the absence of substantial amounts of $O_2$, the NOx catalyst 110 consumes the NOx and some CO to create a GT engine exhaust stream with no $O_2$, no NOx but some CO. The air injection provided by the air injection apparatus 115 adds enough $O_2$ to enable the second CO catalyst 120 to consume the CO, leaving no NOx and no CO in the stream but trace $O_2$ and carbon dioxide ($CO_2$).

A shown in FIG. 2, the system 10 may include controller 200 to modulate the relative amounts of the portion and the remaining portion of the GT engine exhaust by control of the first inlet guide vanes 201, the second inlet guide vanes 202 and valve 203 in accordance with sensor 210 readings. The valve 203 is disposed on or at the air injection apparatus 115 and may be employed to increase or decrease the amount of the air injected into the second HRSG 80 upstream from the second CO catalyst 120. The sensor 210 may be any sensor that is capable of sensing a condition within for example the second HRSG 80 that is reflective of an operating condition of the GT 20, the second HRSG 80 and/or the three way catalysts. The sensor 210 may, therefore, comprise a thermocouple disposed within the conduit 24 or the second HRSG 80 to determine a temperature of the GT engine exhaust or a calorimeter or a gas chromatograph disposed within the second HRSG 80 to evaluate an effectiveness of the NOx and/or CO consumption, or an Oxygen sensor. The sensor 210 may be a single component or plural and possibly various components disposed in various locations.

In operation, the sensor 210 may take measurements of the condition and relay data to the controller 200 that is reflective of those measurements. Responsively, the controller 200 may send out in real-time control signals to the first inlet guide vanes 201, the second inlet guide vanes 202 and the valve 203 that instruct those features to open, close or remain in a current open/close state. Thus, if the exemplary 60/40 per cent ratio is currently in effect and it is determined via sensor 210 readings that the NOx and CO emissions are completely reduced, the controller 200 may control the first and second inlet guide vanes 201, 202 and the valve 203 to continue to remain in their current open/closed states. By contrast, if it is revealed that the NOx and CO emissions are not completely reduced, the controller 200 may control the first and second inlet guide vanes 201, 202 and the valve 203 to modify their current open/closed states.

Figure 3:
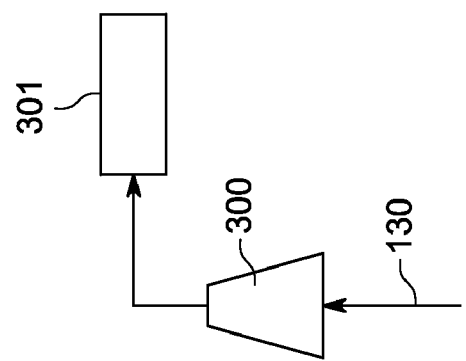
FIG. 3 is a schematic diagram of an exhaust system for use with the system of FIG. 1.

With reference to FIGS. 1 and 3, the system 10 may further include an exhaust system 130, which is coupled to the distal end of the second HRSG 80 downstream from the second CO catalyst 120. The exhaust system 130 directs treated GT engine exhaust to, for example, a stack 300 whereby the treated GT engine exhaust is released to the atmosphere. In accordance with the description provided above, since the treated GT engine exhaust is free of or substantially free of NOx or CO emissions, the production of electricity provided by the electrical generator 40 may be accomplished without significant financial penalty imposed by current regulations governing the emissions of pollutants. However, due to the reduction of NOx emissions provided for herein, such penalties may be avoided. Moreover, the $CO_2$ remaining in the treated GT engine exhaust may be collected in a carbon capture system 301 and disposed of in an environmentally appropriate manner.

Figure 4:
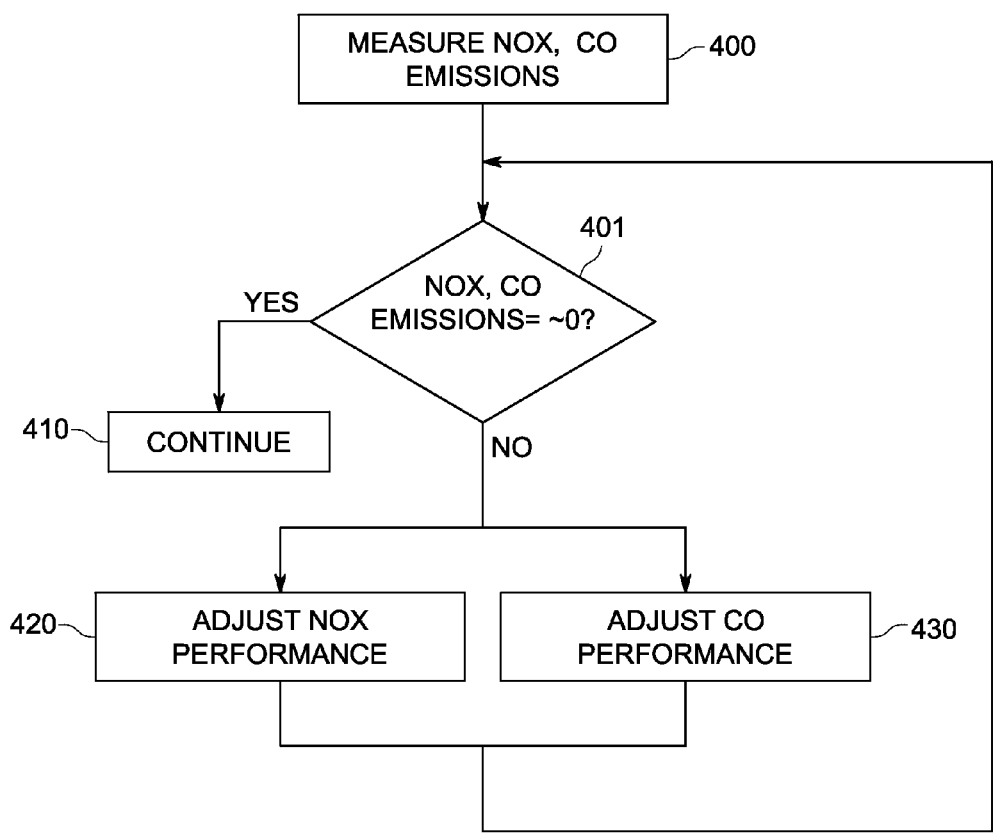
FIG. 4 is a flow diagram illustrating a method of operating the system of FIG. 1.

In accordance with further aspects and, with reference to FIG. 4, a method of operating a turbomachine system, such as a gas turbine (GT) engine 20 system, is provided and includes permitting a portion of GT engine exhaust to be received in a first HRSG 70 for delivery to a compressor 21 of the GT engine 20 and a remaining portion of the GT engine exhaust to be received in a second HRSG 80 in which NOx and CO in the GT engine exhaust are consumed and sensing whether the NOx and the CO consumption is substantially complete. The sensing may be accomplished by for example measuring the NOx and/or CO and/or $O_2$ emissions (400) or by similarly measuring a temperature of the GT engine exhaust. It may then be determined whether the NOx/CO emissions are zero or substantially close to zero (401). If they are, the controller 200 controls the first inlet guide vanes 201 and the second inlet guide vanes 202 and the valve 203, respectively, to continue to operate in their current states (410). By contrast, if the emissions are not substantially zeroed, the controller 200 adjusts NOx performance 420 and/or CO performance 430 as described above. During system 10 operation, this feedback control may be consistently repeated in real-time.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A split heat recovery steam generator (HRSG) arrangement to reduce emissions in exhaust gases emitted from a turbomachine system to generate electricity including a compressor, a combustor fluidly coupled to and disposed downstream from the compressor and a turbine fluidly coupled to and disposed downstream from the combustor to receive combustion gases and fluidly connected to the compressor to receive cooling and leakage fluid, the arrangement comprising:
    a first HRSG coupled to the turbine and thereby receptive of a portion of the exhaust gases to deliver the portion of the exhaust gases to the compressor;
    a second HRSG coupled to the turbine and thereby receptive of a remaining portion of the exhaust gases, which includes an NOx catalyst and a CO catalyst sequentially disposed therein to remove NOx and CO from the exhaust gases; and
    an air injection apparatus to inject air into the second HRSG between the NOx catalyst and the CO catalyst to facilitate CO consumption at the CO catalyst.

2. The arrangement according to claim 1, wherein an additional CO catalyst is disposed upstream from the NOx catalyst to convert trace $O_2$ and CO into $CO_2$.

3. The arrangement according to claim 1, wherein the combustor comprises one or more of dry low NOx (DLN) components and late lean injection (LLI) components.

4. The arrangement according to claim 1, further comprising a controller to modulate amounts of the exhaust gases respectively receivable by the first and second HRSGs and an amount of the air injected into the second HRSG.

5. The arrangement according to claim 1, wherein the first HRSG is receptive of about 55-65% by mass of the exhaust gases and the second HRSG is receptive of about 35-45% by mass of the exhaust gases.

6. The arrangement according to claim 1, further comprising:
    a shaft rotatably driven by the turbomachine; and
    an upstream compressor coupled to the shaft to output compressed air to the combustor in accordance with shaft rotation.

7. The arrangement according to claim 1, further comprising:
    a shaft rotatably driven by the turbomachine; and
    a generator coupled to the shaft to generate electricity from shaft rotation.

8. The arrangement according to claim 1, further comprising an exhaust system coupled to the second HRSG, the exhaust system comprising a carbon capture system to capture carbon dioxide in the exhaust gases.

9. A system to generate electricity, comprising:
    a turbomachine, including a compressor, a combustor fluidly coupled to and disposed downstream from the compressor and a turbine fluidly coupled to and disposed downstream from the combustor to receive combustion gases and fluidly connected to the compressor to receive cooling and leakage fluid;
    a first heat recovery steam generator (HRSG), coupled to the turbine and thereby receptive of a portion of exhaust gases output from the turbine, the first HRSG being configured to deliver the portion of the exhaust gases to the compressor;
    a second HRSG, coupled to the turbine and thereby receptive of a remaining portion of the exhaust gases output from the turbine, which includes an NOx catalyst and a CO catalyst sequentially disposed therein to treat the received exhaust gases; and
    an air injection apparatus to inject air into the second HRSG between the NOx catalyst and the CO catalyst to facilitate CO consumption at the CO catalyst.

10. The system according to claim 9, wherein an additional CO catalyst is disposed upstream from the NOx catalyst to convert trace $O_2$ and CO into $CO_2$.

11. The system according to claim 9, wherein the combustor comprises one or more of dry low NOx (DLN) components and late lean injection (LLI) components.

12. The system according to claim 9, further comprising:
    a controller to modulate amounts of the exhaust gases respectively receivable by the first and second HRSGs and an amount of the air injected into the second HRSG; and
    a sensor to sense a condition reflective of a treatment of the exhaust gases, the controller being operably coupled to the sensor and configured to modulate the relative amounts of the exhaust gases and the injected air in accordance with a result of the sensing.

13. The system according to claim 12, further comprising inlet guide vanes operably coupled to the controller and disposed within at least the compressor by which the controller modulates the relative amounts of the exhaust gases respectively receivable by the first and second HRSGs.

14. The system according to claim 9, wherein the first HRSG is receptive of about 55-65% by mass of the exhaust gases and the second HRSG is receptive of about 35-45% by mass of the exhaust gases.

15. The system according to claim 9, further comprising:
a shaft rotatably driven by the turbomachine; and
an upstream compressor coupled to the shaft to output compressed air to the combustor in accordance with shaft rotation.

16. The system according to claim 9, further comprising:
a shaft rotatably driven by the turbomachine; and
a generator coupled to the shaft to generate electricity from shaft rotation.

17. The system according to claim 9, further comprising an exhaust system coupled to the second HRSG, the exhaust system comprising a carbon capture system to capture carbon dioxide in the exhaust gases.

\* \* \* \* \*